(12) United States Patent
Kuroda et al.

(10) Patent No.: US 10,414,411 B2
(45) Date of Patent: Sep. 17, 2019

(54) NOTIFICATION CONTROL APPARATUS AND NOTIFICATION CONTROL METHOD

(71) Applicant: Mitsubishi Electric Corporation, Tokyo (JP)

(72) Inventors: Masayuki Kuroda, Tokyo (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/072,020

(22) PCT Filed: Mar. 30, 2016

(86) PCT No.: PCT/JP2016/060293
§ 371 (c)(1),
(2) Date: Jul. 23, 2018

(87) PCT Pub. No.: WO2017/168602
PCT Pub. Date: Oct. 5, 2017

(65) Prior Publication Data
US 2019/0023282 A1    Jan. 24, 2019

(51) Int. Cl.
*B60W 50/14* (2012.01)
*H04S 1/00* (2006.01)
(Continued)

(52) U.S. Cl.
CPC ............ *B60W 50/14* (2013.01); *B60Q 5/006* (2013.01); *G05D 1/0088* (2013.01); *G06F 3/167* (2013.01);
(Continued)

(58) Field of Classification Search
CPC .. G05D 1/0088; G05D 1/0276; G05D 1/0287; G05D 1/0022; G05D 1/0055;
(Continued)

(56) References Cited

U.S. PATENT DOCUMENTS

2002/0198632 A1* 12/2002 Breed ................. B60N 2/2863
701/1
2005/0128106 A1   6/2005 Nakaishi et al.
(Continued)

FOREIGN PATENT DOCUMENTS

EP    1787866 A1    5/2007
JP    7-83674 A     3/1995
(Continued)

OTHER PUBLICATIONS

International Search Report (PCT/ISA/210) issued in PCT/JP2016/060293, dated Jun. 21, 2016.
(Continued)

*Primary Examiner* — Daniel Previl
(74) *Attorney, Agent, or Firm* — Birch, Stewart, Kolasch & Birch, LLP (57) ABSTRACT

It is an object of the present invention to provide a notification control apparatus and a notification control method capable of previously notifying a passenger of a change of a motion of a vehicle travelling automatically. A notification control apparatus according to the present invention includes: a processor to execute a program; and a memory to store the program which, when executed by the processor, performs processes of, acquiring travel condition information which is information indicating a future travel condition of the vehicle, generating a sound image pattern based on the travel condition information, and generating a notification sound in accordance with the sound image pattern and, controlling the output of the notification sound, wherein the travel condition information includes information of a future course of the vehicle, and when the course is changed, the sound image pattern in accordance with the course being changed is generated.

10 Claims, 10 Drawing Sheets

(51) Int. Cl.
*G05D 1/00* (2006.01)
*G06F 3/16* (2006.01)
*B60Q 5/00* (2006.01)
*G08G 1/16* (2006.01)

(52) U.S. Cl.
CPC ....... *H04S 1/00* (2013.01); *G05D 2201/0213* (2013.01); *G08G 1/166* (2013.01); *H04R 2499/13* (2013.01); *H04S 2400/11* (2013.01)

(58) Field of Classification Search
CPC ......... G05D 1/0278; G05D 2201/0213; G05D 1/0005; G05D 1/0027; G05D 1/0212; G05D 1/0214; G05D 1/0217; G05D 1/0223; G05D 1/0246; G05D 1/0285; G05D 1/0291; G01C 21/3415; G01C 21/3492; G01C 21/3691; G01C 21/3602; G01C 21/3469; G01C 21/3461; G01C 21/3658; G01C 21/3697; G01C 21/34; G01C 21/3438; G01C 21/3676; G01C 21/3407; G01C 21/343; G01C 21/3476; G01C 21/3605; G08G 1/0129; G08G 1/096811; G08G 1/0112; G08G 1/096741; G08G 1/096775; G08G 1/202; G08G 1/0116; G08G 1/0145; G08G 1/0141; G08G 1/015; G08G 1/095; G08G 1/096708; G08G 1/096725; G08G 1/207; G08G 1/162; G08G 1/166; G08G 1/096716; G08G 1/165; G08G 1/012; G08G 1/0133; G08G 1/20; G08G 1/0137; G08G 1/09; G08G 1/096844; G08G 1/123; G08G 1/042; G08G 1/0965; G08G 1/096816; G08G 1/096822; G08G 1/096833; G08G 1/16; G08G 1/161; B60W 2550/402; B60W 2710/30; B60W 30/00; B60W 2520/26; B60W 2550/142; B60W 2550/148; B60W 2550/404; B60W 30/09; B60W 40/06; B60W 40/068; B60W 40/076; B60W 50/0098; B60W 30/085; B60W 30/0956; B60W 30/095; B60W 10/04; B60W 10/18; B60W 10/20; B60W 10/30; B60W 2040/0836; B60W 2510/18; B60W 2510/20; B60W 2540/24; B60W 2710/18; B60W 2710/20; B60W 30/182; B60W 30/1843; B60W 40/08; G06Q 10/20; G06Q 10/047; G06Q 10/0631; G06Q 10/063114; G06Q 10/083; G06Q 10/08355; G06Q 10/1097; E01F 13/04; E01F 9/40; Y04S 10/54; Y04S 30/12; B60G 13/14; B60G 17/019; B60G 17/052; B60G 2202/413; B60G 2300/60; B60G 2600/182; B60G 2800/012; F03G 7/08; G07C 5/008; G07C 5/006; G07C 5/0808; G07C 5/02; G07C 5/0825; H04L 67/306; H04L 67/10; H04L 67/12; H04L 67/18; H04W 4/44; H04W 4/046; H04W 84/005; H04W 76/10; B60R 16/037; B60R 17/02; B60R 25/24; B60R 1/00; B60R 2300/102; B60R 2300/30; F16H 61/00; F16H 61/0025; F16H 61/0031; F16H 63/40; B60L 11/1857; B60L 11/1861; B60L 2240/622; B60L 2240/64; B60L 2240/66; B60L 2240/68; B60L 2240/72; B60L 2250/10; B60L 2250/16; B60T 17/22; B60T 2270/406; B60T 7/00; B60T 7/18; B60T 7/22; B60T 8/17; G01S 17/936; G01S 19/39; G01S 5/22; G01S 7/4972; G02B 27/106; G06K 9/00805; G06K 9/00818; G06N 3/0436; G06T 1/20; G07B 15/02; G07B 15/063; H04N 5/2257; H04N 5/2258; H04N 5/23238; H04N 5/2355; H04N 9/045; H04N 9/07; H04N 9/67; H04N 9/735; H04N 9/76; H05K 999/99; Y02T 10/7005; Y02T 90/16; Y02T 90/161; Y02T 90/168
USPC ........... 340/425.5, 995.25, 995.19, 438, 463, 340/539.22, 683, 691.6
See application file for complete search history.

(56) References Cited

U.S. PATENT DOCUMENTS

| | | | |
|---|---|---|---|
| 2014/0278052 A1* | 9/2014 | Slavin | G01C 21/3492 701/400 |
| 2015/0166072 A1* | 6/2015 | Powers | B60W 40/06 701/1 |
| 2015/0224845 A1* | 8/2015 | Anderson | B60G 17/019 701/37 |
| 2016/0094928 A1* | 3/2016 | Shiozawa | H04S 7/30 381/302 |
| 2017/0248949 A1* | 8/2017 | Moran | B60W 30/085 |
| 2017/0270490 A1* | 9/2017 | Penilla | G06Q 10/1095 |

FOREIGN PATENT DOCUMENTS

| | | |
|---|---|---|
| JP | 2001-289660 A | 10/2001 |
| JP | 2005-164291 A | 6/2005 |
| JP | 2007-133486 A | 5/2007 |
| JP | 2010-105643 A | 5/2010 |
| JP | 2014-127100 A | 7/2014 |
| JP | 2015-141476 A | 8/2015 |
| WO | WO 2006/006553 A1 | 1/2006 |
| WO | WO 2014/174840 A1 | 10/2014 |

OTHER PUBLICATIONS

Japanese Office Action, dated Apr. 23, 2019, for Japanese Application No. 2018-507913, with an English translation.

* cited by examiner

NOTIFICATION CONTROL APPARATUS AND NOTIFICATION CONTROL METHOD

TECHNICAL FIELD

The present invention relates to a notification control apparatus performing a control of transmitting notification of a motion of a vehicle traveling automatically to an interior of the vehicle and a notification control method.

BACKGROUND ART

A technique of guiding a route using a sound image is conventionally disclosed (for example, refer to Patent Document 1). Also disclosed is a technique of guiding a visual line of a driver to a point of gaze, which is recommended for a driver to gaze at during traveling, by localizing a sound image to the point of gaze (for example, refer to Patent Document 2).

PRIOR ART DOCUMENTS

Patent Documents
Patent Document 1: Japanese Patent Application Laid-Open No. 2001-289660
Patent Document 2: Japanese Patent Application Laid-Open No. 2014-127100

SUMMARY

Problem to be Solved by the Invention

The techniques of Patent Documents 1 and 2 provide the driver with information necessary in driving the vehicle, and show a point or a direction on which the driver focuses, thus is effective when the driver himself/herself drives the vehicle (manually drives the vehicle). However, a case of an automatic driving of the vehicle is not considered in Patent Documents 1 and 2. In the automatic driving, the driver is released from the driving of the vehicle, and the vehicle performs a drive control. Accordingly, when the vehicle which automatically travels automatically operates a handle, a brake, or an accelerator, passengers including the driver cannot be previously informed of a change of a motion of the vehicle, for example, an occurrence of gravity felt in accordance with a future moving route or an acceleration change of a subject vehicle, and cannot prepare for the change of the motion, thus may be confused.

The present invention therefore has been made to solve these problems, and it is an object of the present invention to provide a notification control apparatus and a notification control method capable of making a passenger previously recognize a change of a motion of a vehicle travelling automatically.

Means to Solve the Problem

In order to solve the problems described above, a notification control apparatus according to the present invention is a notification control apparatus which performs a control of transmitting notification of a motion of a vehicle traveling automatically to an interior of the vehicle, and includes: a processor to execute a program; and a memory to store the program which, when executed by the processor, performs processes of, acquiring travel condition information which is information indicating a future travel condition of the vehicle, generating an original sound from a predetermined speech waveform, generating a sound image pattern in which a sound image localization position changes along with an elapse of time based on the travel condition information which has been acquired, and generating a notification sound in which the sound image localization position of the original sound changes along with an elapse of time in accordance with the sound image pattern which has been generated and, controlling the output of the notification sound, wherein the travel condition information includes information of a future course of the vehicle, and when the course is changed, the sound image pattern in accordance with the course being changed is generated.

A notification control method according to the present invention is a notification control method of performing a control of transmitting notification of a motion of a vehicle traveling automatically to an interior of the vehicle, and includes: acquiring travel condition information which is information indicating a future travel condition of the vehicle; generating an original sound from a predetermined speech waveform; generating a sound image pattern in which a sound image localization position changes along with an elapse of time based on the travel condition information; and generating a notification sound in which the sound image localization position of the original sound changes along with an elapse of time in accordance with the sound image pattern, and controlling the output of the notification sound, wherein the travel condition information includes information of a future course of the vehicle, and when the course is changed, the sound image pattern in accordance with the course being changed is generated.

According to the present invention, a notification control apparatus is a notification control apparatus which performs a control of transmitting notification of a motion of a vehicle traveling automatically to an interior of the vehicle, and includes: a processor to execute a program; and a memory to store the program which, when executed by the processor, performs processes of, acquiring travel condition information which is information indicating a future travel condition of the vehicle, generating an original sound from a predetermined speech waveform, generating a sound image pattern in which a sound image localization position changes along with an elapse of time based on the travel condition information which has been acquired, and generating a notification sound in which the sound image localization position of the original sound changes along with an elapse of time in accordance with the sound image pattern which has been generated and, controlling the output of the notification sound, wherein the travel condition information includes information of a future course of the vehicle, and when the course is changed, the sound image pattern in accordance with the course being changed is generated.

A notification control method is a notification control method of performing a control of transmitting notification of a motion of a vehicle traveling automatically to an interior of the vehicle, and includes: acquiring travel condition information which is information indicating a future travel condition of the vehicle; generating an original sound from a predetermined speech waveform; generating a sound image pattern in which a sound image localization position changes along with an elapse of time based on the travel condition information; and generating a notification sound in which the sound image localization position of the original sound changes along with an elapse of time in accordance with the sound image pattern, and controlling the output of the notification sound, wherein the travel condition information includes information of a future course of the vehicle, and when the course is changed, the sound image pattern in accordance with the course being changed is generated. Thus, the passenger can be previously notified of the change of the motion of the vehicle which automatically travels.

These and other objects, features, aspects and advantages of the present invention will become more apparent from the following detailed description of the present invention when taken in conjunction with the accompanying drawings.

DESCRIPTION OF EMBODIMENT(S)

Embodiments of the present invention are described hereinafter based on the drawings.

Embodiment 1

<Configuration>

A configuration of a notification control apparatus according to the embodiment 1 of the present invention is described.

Figure 1:
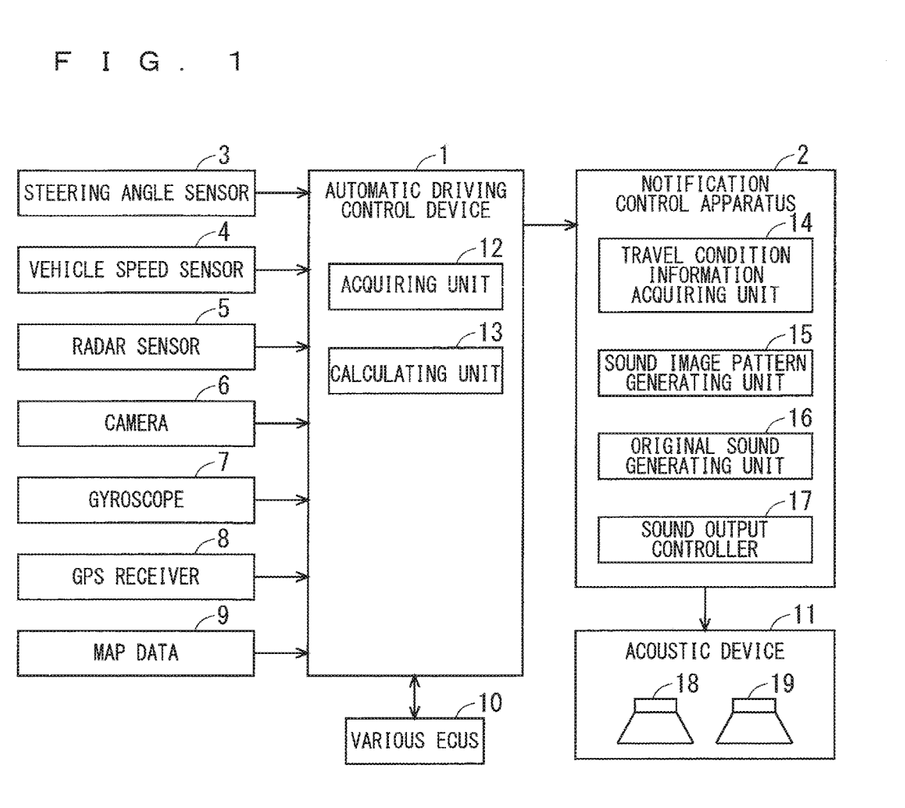
FIG. 1 A block diagram illustrating an example of a configuration of an automatic driving control device and a notification control apparatus according to an embodiment 1 of the present invention.

FIG. 1 is a block diagram illustrating an example of a configuration of an automatic driving control device 1 and a notification control apparatus 2 according to the embodiment 1 of the present invention. Although the automatic driving control device 1 and the notification control apparatus 2 are illustrated separately in FIG. 1, they may be integrally formed. That is to say, the notification control apparatus 2 may have a configuration including the automatic driving control device 1.

The automatic driving control device 1 is connected to various electronic control units (ECUs) 10 to control the automatic driving of the vehicle. The automatic driving control device 1 includes an acquiring unit 12 and a calculating unit 13.

The acquiring unit 12 acquires vehicle information which is information regarding a traveling of the vehicle from a steering angle sensor 3, a vehicle speed sensor 4, and a gyroscope 7, acquires distance information indicating a distance to an object around the vehicle from a radar sensor 5, and acquires image information from a camera 6. The acquiring unit 12 acquires current position information indicating a current position of the vehicle from a global positioning system (GPS) receiver 8. In addition to the current position information acquired from the GPS receiver 8, the current position information may be corrected by matching the vehicle information acquired from the steering angle sensor 3, the vehicle speed sensor 4, and the gyroscope 7 to a map data 9. The map data 9 may be acquired from a storage (not shown), and may also be acquired from outside via communication.

The calculating unit 13 determines a next course along which the vehicle travels and a speed of the vehicle at that time based on each information acquired by the acquiring unit 12 and a predetermined route of the automatic driving. The information of the next course and the speed of the vehicle at that time are collectively referred to as the travel condition information. Herein, the next course indicates a future route along which the vehicle travels and a moving route applying time as a parameter. The calculating unit 13 can calculate a distance to the non-subject vehicle in front of the subject vehicle, for example, based on the distance information acquired from the radar sensor 5. The calculating unit 13 can calculate a distance to a non-subject vehicle in front of the subject vehicle, an obstacle on the course of the vehicle, and a compartment line provided on a road along which the vehicle travels, for example, based on the image information acquired from the camera 6.

The notification control apparatus 2 performs a control of transmitting notification of a motion of the vehicle traveling automatically to an interior of the vehicle.

The notification control apparatus 2 includes a travel condition information acquiring unit 14, a sound image pattern generating unit 15, an original sound generating unit 16, and a sound output controller 17.

The travel condition information acquiring unit 14 acquires the travel condition information which is information indicating a future travel condition of the vehicle from the automatic driving control device 1.

The sound image pattern generating unit 15 generates a sound image pattern based on the travel condition information acquired by the travel condition information acquiring unit 14. Specifically, the sound image pattern generating unit 15 generates a movement pattern of the sound image as the sound image pattern. At this time, the sound image pattern generating unit 15 generates the sound image pattern so that a position of the sound image being output from speakers 18 and 19 of an acoustic device 11 is set to a desired position along with an elapse of time under control of the sound output controller 17. Herein, the sound image is an acoustic sound source. A human can feel a position, a loudness, and a shape, for example, of the sound source upon hearing a sound, and the sound which the human sensuously catch is referred to as the sound source. The position of the sound source is particularly controlled in the present invention. The sound image pattern indicates a temporal change pattern of the sound image position reflecting the moving route of the vehicle, acceleration in accordance with the movement, or a gravity change which the passenger feels. The sound image position is also referred to as the sound image localization position.

The original sound generating unit 16 generates the original sound. Specifically, the original sound generating unit 16 generates the original sound from a predetermined speech waveform (a default speech waveform). At this time, the original sound generating unit 16 controls the speech waveform so that a desired notification sound is output from the speakers 18 and 19 of the acoustic device 11 in combination with the sound image pattern generated in the sound image pattern generating unit 15 under control of the sound output controller 17, thereby generating the original sound. As described above, the original sound is the speech waveform, and includes a parameter of a loudness of sound or a sound quality, for example.

The original sound generating unit 16 may generate the original sound generated by changing the default speech waveform based on the travel condition information acquired by the travel condition information acquiring unit 14. In the above case, the sound image pattern generated in the sound image pattern generating unit 15 and the original sound generated in the original sound generating unit 16 cooperate with each other based on the travel condition information.

The sound output controller 17 controls the acoustic device 11 so that the acoustic device 11 outputs the notification sound which is a combination of the sound image pattern generated in the sound image pattern generating unit 15 and the original sound generated in the original sound generating unit 16. That is to say, the sound output controller 17 generates the notification sound in which the sound image position of the original sound changes along with an elapse of time in accordance with the sound image pattern.

The acoustic device 11 has the speakers 18 and 19. The speakers 18 and 19 are provided on a driver seat side and a front passenger seat side, respectively, for example. Although FIG. 1 illustrates a case where the acoustic device 11 has the two speakers 18 and 19, the configuration of the acoustic device 11 is not limited thereto. The acoustic device 11 may have three or more speakers. For example, in case of the four speakers, each of the speakers may be provided near a front door on the driver seat side and the front passenger seat side and near a roof on the driver seat side and the front passenger seat side.

Figure 2:
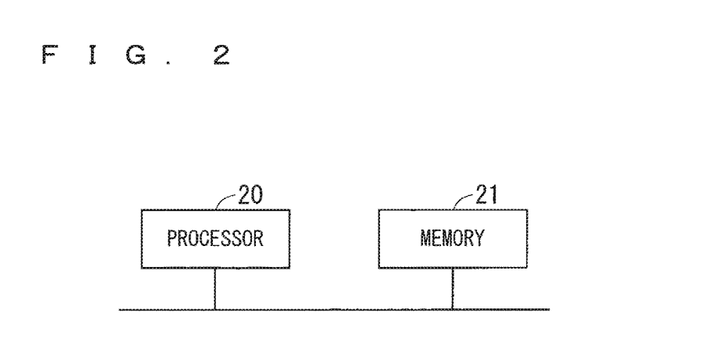
FIG. 2 A block diagram illustrating an example of a hardware configuration of the notification control apparatus according to the embodiment 1 of the present invention.

FIG. 2 is a block diagram illustrating an example of a hardware configuration of the notification control apparatus 2.

Each function of the travel condition information acquiring unit 14, the sound image pattern generating unit 15, the original sound generating unit 16, and the sound output controller 17 in the notification control apparatus 2 is achieved by a processing circuit. That is to say, the notification controller 2 includes the processing circuit for performing a control to acquire the travel condition information, generate the sound image pattern, generate the original sound, and output the notification sound which is the combination of the sound image pattern and the original sound. The processing circuit is a processor 20 (also referred to as a central processing unit, a processing device, an arithmetic device, a microprocessor, a microcomputer, or a digital signal processor (DSP)) for executing a program stored in a memory 21.

Each function of the travel condition information acquiring unit 14, the sound image pattern generating unit 15, the original sound generating unit 16, and the sound output controller 17 in the notification control apparatus 2 is achieved by software, firmware, or a combination of software and firmware. The software or the firmware is described as a program, and is stored in the memory 21. The processing circuit reads out and executes the program stored in the memory 21, thereby achieving the functions of each unit. That is to say, the notification control apparatus 2 includes the memory 21 storing programs which consequently execute a step of acquiring the travel condition information, a step of generating the sound image pattern, a step of generating the original sound, and a step of performing the control to output the notification sound which is the combination of the sound image pattern and the original sound. These programs are also deemed to make a computer execute a procedure or a method of the travel condition information acquiring unit 14, the sound image pattern generating unit 15, the original sound generating unit 16, and the sound output controller 17. Herein, a non-volatile or volatile semiconductor memory such as a random access memory (RAM), a read only memory (ROM), a flash memory, an erasable programmable read only memory (EPROM), or an electrically erasable programmable read only memory (EEPROM), a magnetic disc, a flexible disc, or an optical disc, for example, falls under the memory.

Although the hardware configuration of the notification control apparatus 2 is described above, the same applies to the hardware configuration of the automatic driving control device 1.

<Operation>

An operation of the automatic driving control device 1 and the notification control apparatus 2 according to the present embodiment 1 is described next.

Figure 3:
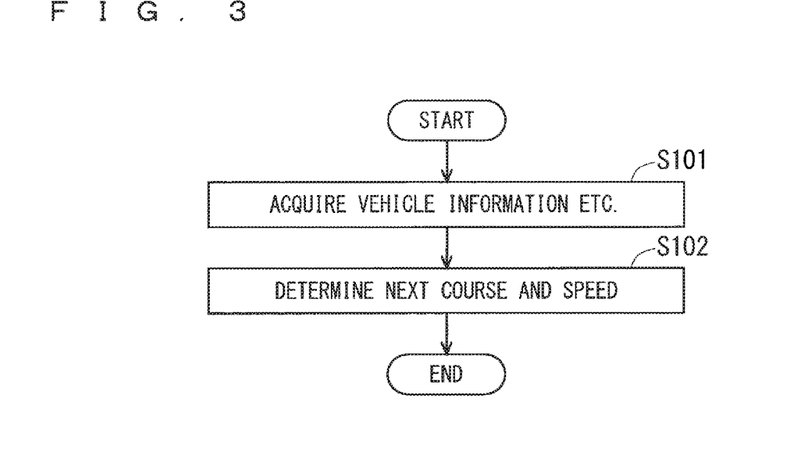
FIG. 3 A flow chart illustrating an example of an operation of the automatic driving control device according to the embodiment 1 of the present invention.

FIG. 3 is a flow chart illustrating an example of the operation of the automatic driving control device 1, and illustrates an example of the operation of the vehicle automatically traveling along a predetermined route.

In Step S101, the acquiring unit 12 acquires the vehicle information from the steering angle sensor 3, the vehicle speed sensor 4, and the gyroscope 7, acquires the distance information from the radar sensor 5, and acquires the image information from the camera 6. The acquiring unit 12 acquires the current position information from the GPS receiver 8, matches the current position information to the map data 9.

In Step S102, the calculating unit 13 determines the next course along which the vehicle travels and the speed of the vehicle at that time based on each information acquired by the acquiring unit 12 and the predetermined route of the automatic driving. At this time, when there is an obstacle in a traveling direction of the vehicle, for example, the calculating unit 13 determines a course for preventing the obstacle.

Figure 4:
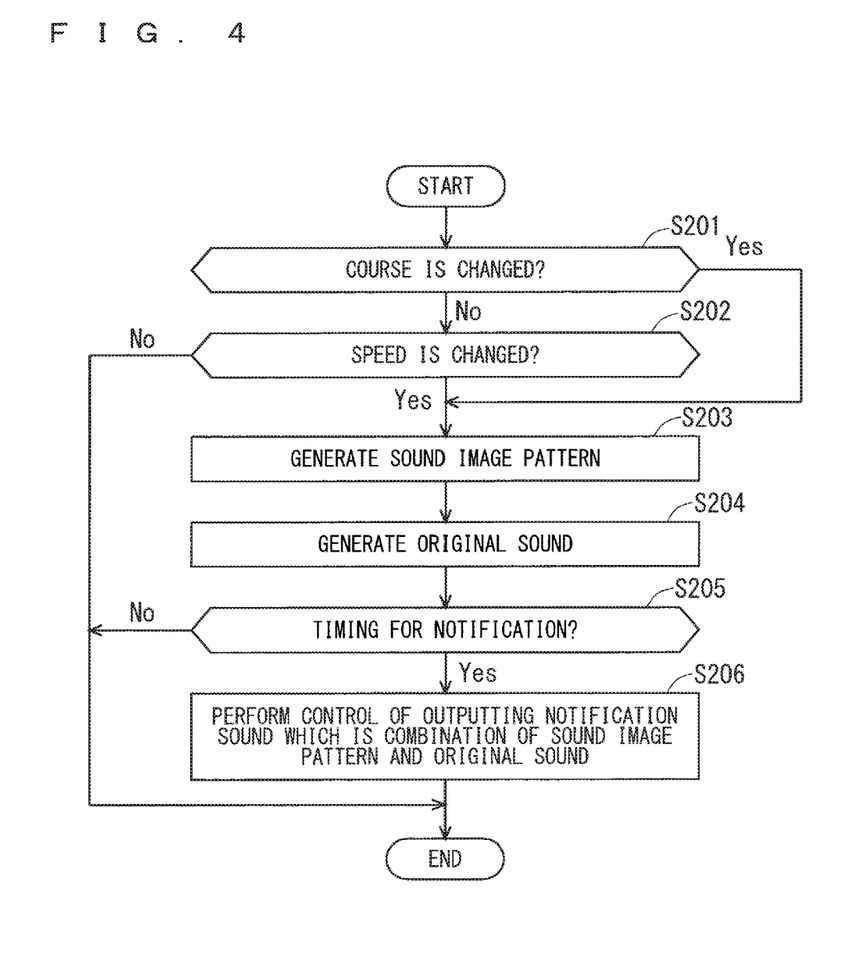
FIG. 4 A flow chart illustrating an example of an operation of the notification control apparatus according to the embodiment 1 of the present invention.

FIG. 4 is a flow chart illustrating an example of the operation of the notification control apparatus 2. The travel condition information acquiring unit 14 of the notification control apparatus 2 acquires the travel condition information which is the next course along which the vehicle travels and the speed of the vehicle at that time from the automatic driving control device 1.

In Step S201, the travel condition information acquiring unit 14 determines whether or not the next course along which the vehicle travels is changed. Herein, examples of the case where the next course is changed include a case of entering a service area during traveling along an expressway, a case of exiting an exit ramp of an expressway, a case of changing a traveling lane, and entering a curve, for example. Specifically, the travel condition information acquiring unit 14 determines whether or not the next course is changed based on the travel condition information acquired from the calculating unit 13.

It is also applicable that a threshold value is set and the travel condition information acquiring unit 14 determines that the course is not changed when the vehicle moves a little as is a case for traveling along a gentle curve, for example. In the above case, the sound image pattern and the original sound are not generated in the subsequent processing. Optional barometers may be used in the determination, the barometers including a condition where the acceleration is below a certain level, a condition where a movement distance in a lateral direction per unit time is below a certain level, a sum of absolute values of right-and-left movement in a unit of time, or a barometer in which accelerations in an anteroposterior direction, a vertical direction, and a right-and-left direction are weighted for each direction. Particularly, a change in the anteroposterior direction indicates a brake operation or an accelerator operation, thus the weighting may be increased by reason of a possibility that the driver hits his/her head on the handle. The barometers are not limited to those described above, however, a combination of them may also be applicable.

When the next course is changed, the processing makes a transition to Step S203. In the meanwhile, when the next course is not changed, the processing makes a transition to Step S202.

In Step S202, the travel condition information acquiring unit 14 determines whether or not the speed of the vehicle is changed. When the speed is changed, the processing makes a transition to Step S203. In the meanwhile, when the speed of the vehicle is not changed, the processing is finished.

It is also applicable that a threshold value is set and the travel condition information acquiring unit 14 determines that the speed is not changed in a case of a gentle speed adjustment, for example.

Figure 5:
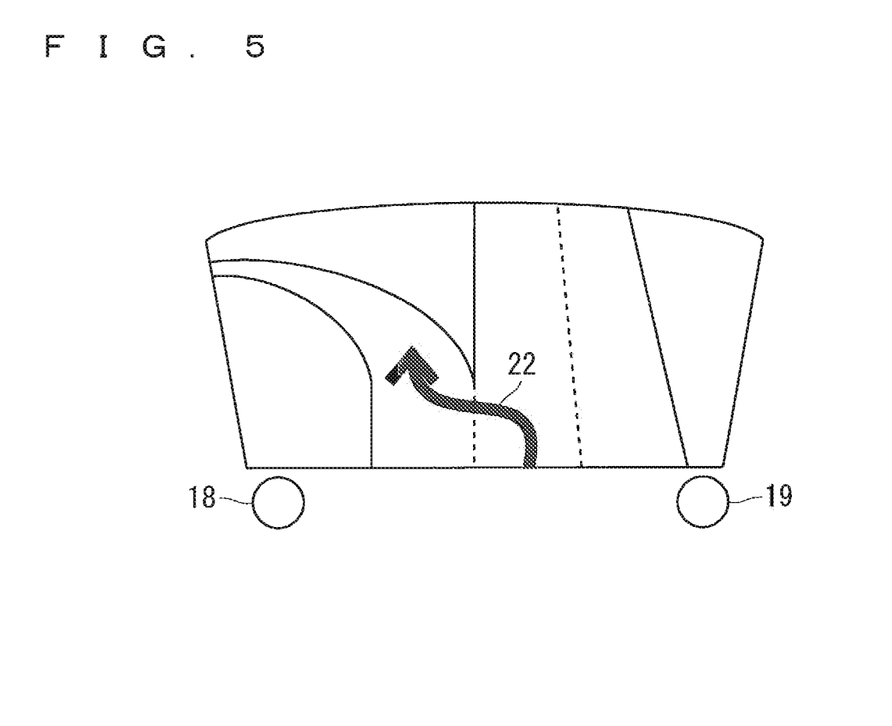
FIG. 5 A drawing illustrating an example of an operation of the notification control apparatus according to the embodiment 1 of the present invention.
Figure 6:
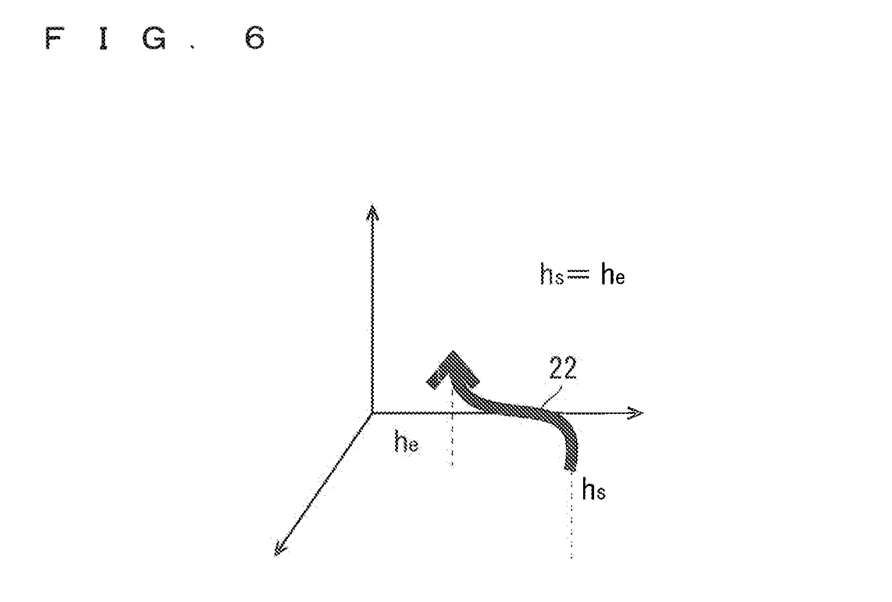
FIG. 6 A diagram illustrating an example of a sound image pattern according to the embodiment 1 of the present invention.

When it is determined in Step S201 and Step S202 that the motion of the vehicle is changed subsequently, the sound image pattern generating unit 15 generates the sound image pattern based on the travel condition information acquired by the travel condition information acquiring unit 14 in Step S203. Specifically, when the course is changed, the sound image pattern generating unit 15 generates the sound image pattern along with the changed course. For example, when the vehicle traveling along the expressway enters a service area, the sound image pattern generating unit 15 generates the sound image pattern of a notification sound 22 as illustrated in FIG. 5. Specifically, the sound image pattern generating unit 15 generates the sound image pattern such that the sound image of the notification sound 22 moves along the course toward the service area (the sound image pattern of the notification sound 22 moves ahead to the left in FIG. 5). A height of a position of the sound image pattern of the notification sound 22 at this time is the same from a start position (hs) to an end position (he) of the sound image pattern of the notification sound 22 as illustrated in FIG. 6. When the speed of the vehicle changes, the sound image pattern generating unit 15 generates the sound image pattern making the passenger feel the change of speed. For example, when the vehicle decreases the speed, the sound image pattern generating unit 15 generates the sound image pattern such that the sound image moves closer from a distance.

In Step S204, the original sound generating unit 16 generates the original sound based on the travel condition information acquired by the travel condition information acquiring unit 14. Specifically, when the course is changed, the original sound generating unit 16 generates the original sound which is combined with the sound image pattern generated in the sound image pattern generating unit 15. For example, in the case in FIG. 5, the original sound generating unit 16 generates the original sound combined with the sound image pattern of the notification sound 22. When the speed of the vehicle changes, the original sound generating unit 16 generates the original sound in accordance with the change of speed. For example, when the vehicle decreases the speed, the original sound generating unit 16 generates the original sound which indicates that the vehicle decreases the speed.

Figure 7:
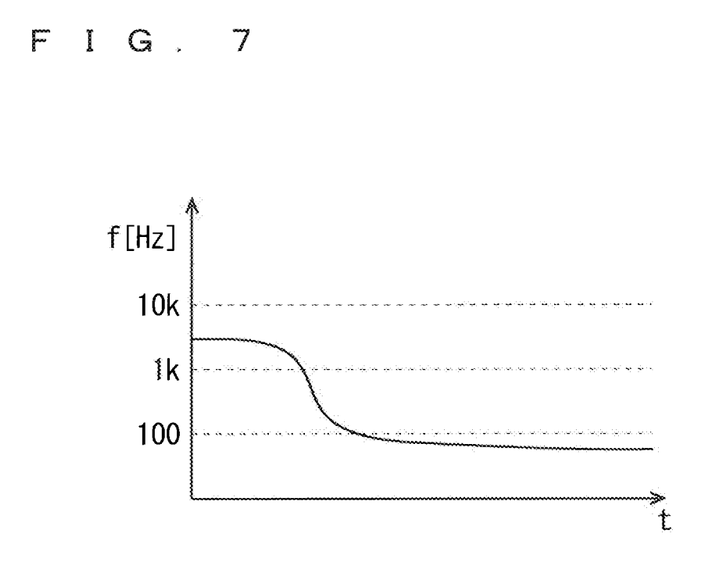
FIG. 7 A diagram illustrating an example of an original sound according to the embodiment 1 of the present invention.
Figure 8:
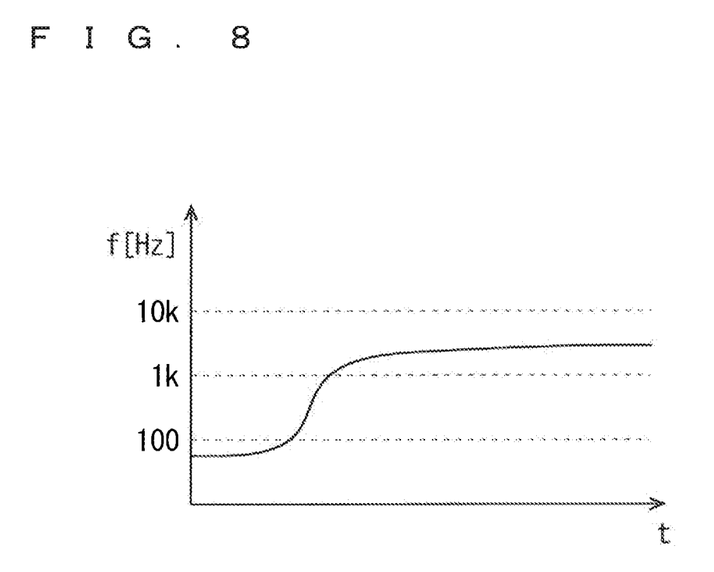
FIG. 8 A diagram illustrating an example of an original sound according to the embodiment 1 of the present invention.
Figure 9:
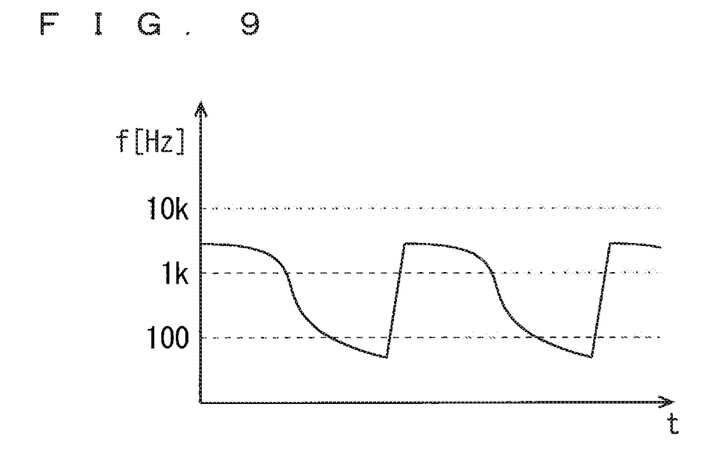
FIG. 9 A diagram illustrating an example of an original sound according to the embodiment 1 of the present invention, FIG. 10 A diagram illustrating an example of an original sound according to the embodiment 1 of the present invention.
Figure 10:
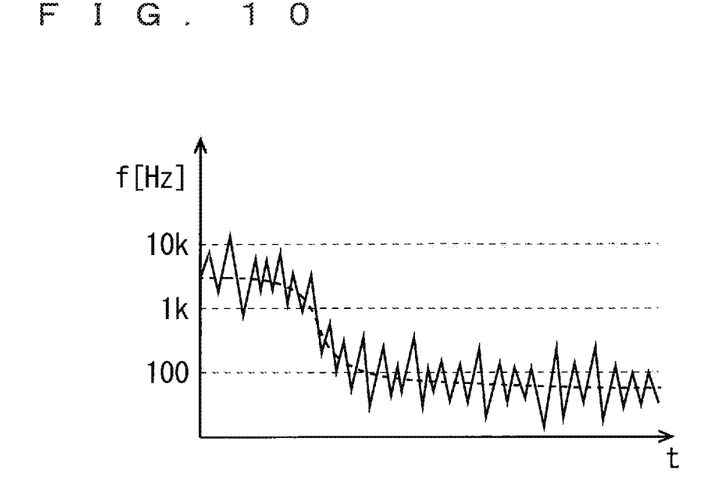

The original sound generating unit 16 can generate the original sound as illustrated in FIGS. 7 to 10, for example. FIG. 7 illustrates an example of the original sound of single tone expressing that the vehicle decreases the speed, and a frequency of the original sound is changed from a high frequency to a low frequency. FIG. 8 illustrates an example of the original sound of single tone expressing that the vehicle increases the speed, and a frequency of the original sound is changed from a low frequency to a high frequency. FIG. 9 illustrates an example of the original sound of single tone expressing that the vehicle rapidly decreases or increases the speed, and a frequency of the original sound is changed repeatedly several times. FIG. 10 illustrates an example of a case where an audio guidance is added to the single tone illustrated in FIG. 7, and expresses that the vehicle decreases the speed.

In Step S205, the sound output controller 17 determines whether or not a timing for outputting the notification sound has come. When it is determined that the timing for the notification has come, the processing proceeds to Step S206. In the meanwhile, the timing for the notification has not come, the processing is finished.

Each processing in FIG. 4 is executed repeatedly as long as the automatic driving is performed. Herein, the timing for outputting the notification sound is determined based on a predetermined rule. For example, the timing may be set to a predetermined time before the travel condition of the vehicle changes, for example, two seconds before. It is also applicable to output the notification sound earlier with increase in the change of the travel condition of the vehicle in accordance with a magnitude of the change.

It is also applicable that the timing for outputting the notification sound is changed between a case where the position of the vehicle changes up and down and a case where the position of the vehicles changes to right and left. For example, when the position of the vehicle changes up and down, the notification sound may be output early. When the vehicle decreases the speed, the notification sound may be output early. It is also applicable to detect an attention level of the driver by a driver condition estimating unit not shown and output the notification sound earlier with decreases in the attention level. In the above case, an awareness level of the driver may be deemed as the attention level.

In Step S206, the sound output controller 17 controls the acoustic device 11 so that the acoustic device 11 outputs the notification sound which is a combination of the sound image pattern generated in the sound image pattern generating unit 15 and the original sound generated in the original sound generating unit 16. Accordingly, the notification sound which is a combination of the sound image pattern and the original sound is output from the speakers 18 and 19 of the acoustic device 11.

In Step S203 and Step S204, when the vehicle rapidly decreases the speed or rapidly spins, it is also applicable that an oscillation of the sound image pattern and the original sound is increased (fir example, an amplitude of the frequency s increased in FIG. 9) to attract attention of the passenger of the vehicle.

In FIG. 4, any of the processing of Step S201 and Step S202 may be executed first.

As described above, according to the present embodiment 1, the passenger can be previously notified of the change of the motion of the vehicle which automatically travels. In the example in FIG. 5, the passenger of the vehicle can be previously notified of the vehicle moving ahead to the left and the vehicle decreasing the speed, thus can prepare for the future motion of the vehicle.

Embodiment 2

Described in the embodiment 2 of the present invention is a case where the vehicle travels on an upward slope or a downward slope in the next course. Since the configurations of the automatic driving control device and the notification control apparatus according to the present embodiment 2 are similar to those of the automatic driving control device 1 and the notification control apparatus 2 according to the embodiment 1 (refer to FIG. 1), the detailed description is omitted here. The description hereinafter is based on an assumption that the automatic driving control device and the notification control apparatus according to the present embodiment 2 are the automatic driving control device 1 and the notification control apparatus 2 illustrated in FIG. 1.

Figure 11:
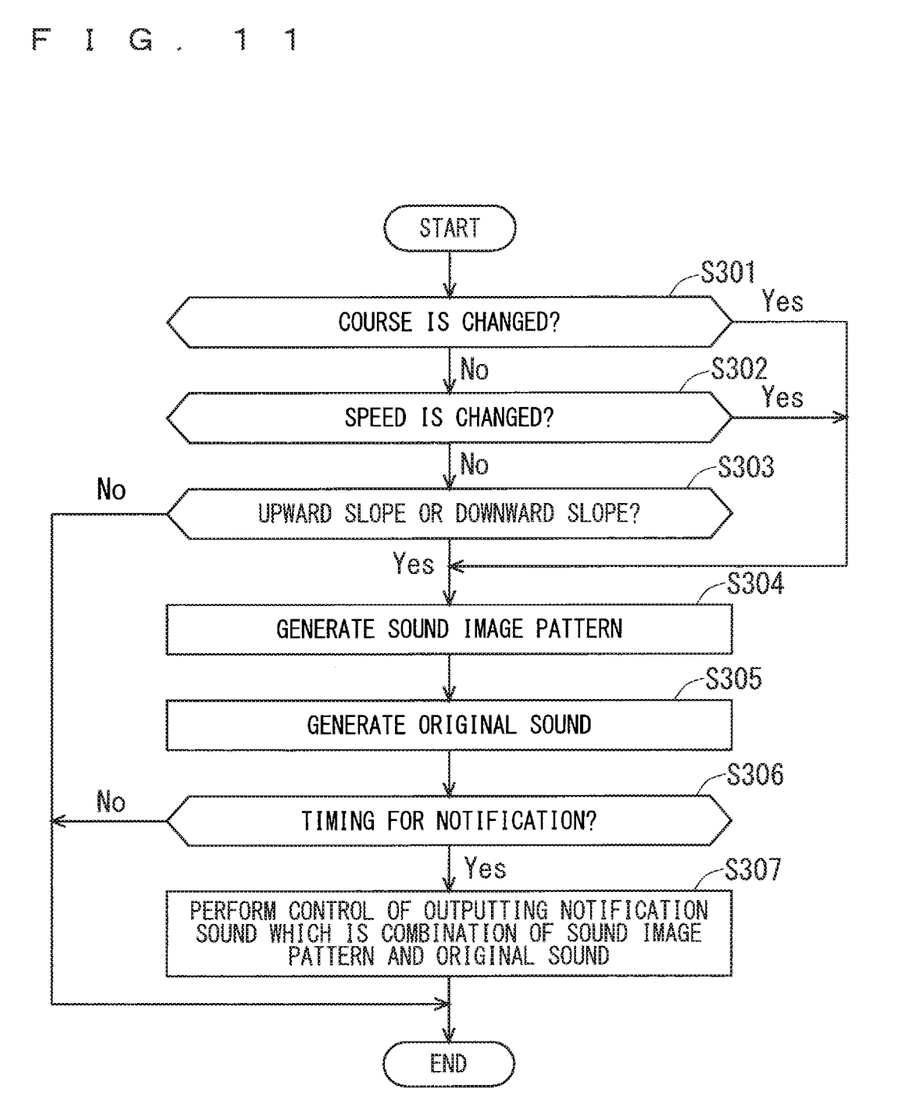
FIG. 11 A flow chart illustrating an example of an operation of the notification control apparatus according to an embodiment 2 of the present invention.

FIG. 11 is a flow chart illustrating an example of an operation of the notification control apparatus 2 according to the present embodiment 2, and illustrates an example of an operation of the vehicle automatically traveling along a predetermined route. Since Step S301, Step S302, Step S305, and Step S306 in FIG. 11 correspond to Step S201, Step S202, Step S204, and Step S205 in FIG. 4, the description is omitted here. Step S303, Step S304, and Step S307 are described hereinafter.

In Step S303, the travel condition information acquiring unit 14 determines whether or not the vehicle travels on an upward slope or a downward slope in the next course. Herein, examples of the case where the vehicle travels on the upward slope or the downward slope in the next course include a case of exiting an exit ramp of an expressway, for example. Specifically, the calculating unit 13 determines whether or not the next course along which the vehicle travels includes an upward slope or a downward slope based on height information included in the map data 9.

When the vehicle travels on the upward slope or the downward slope in the next course, the processing makes a transition to Step S304. In the above case, the calculating unit 13 outputs the information of the upward slope or the downward slope as the travel condition information to the travel condition information acquiring unit 14. In the meanwhile, when the vehicle does not travel on the upward slope or the downward slope in the next course, the processing is finished.

It is also applicable that a threshold value is set and the calculating unit 13 determines that there is no slope change when the slope changes a little as is a case for entering a gentle upward slope or a gentle downward slope, for example. In the above case, the sound image pattern and the original sound are not generated in the subsequent processing.

Figure 12:
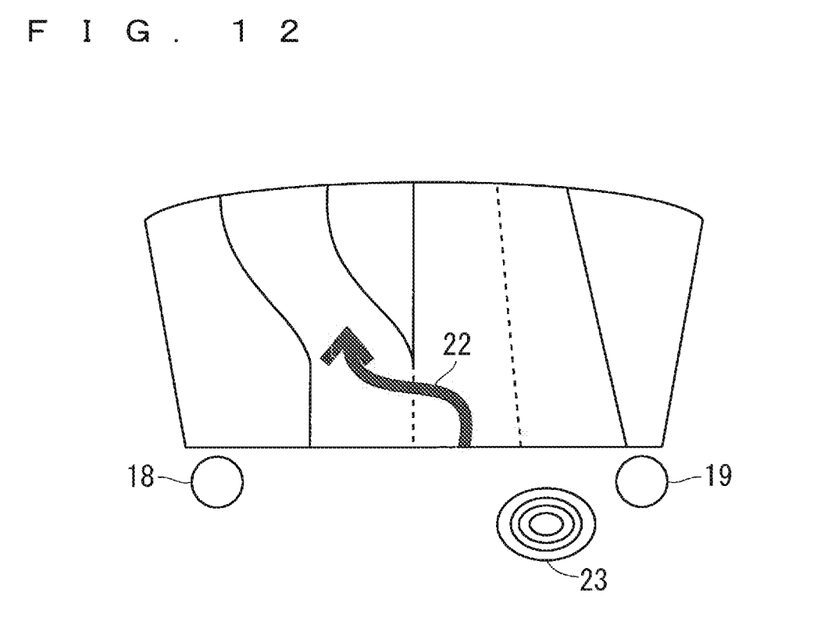
FIG. 12 A drawing illustrating an example of an operation of the notification control apparatus according to the embodiment 2 of the present invention.
Figure 13:
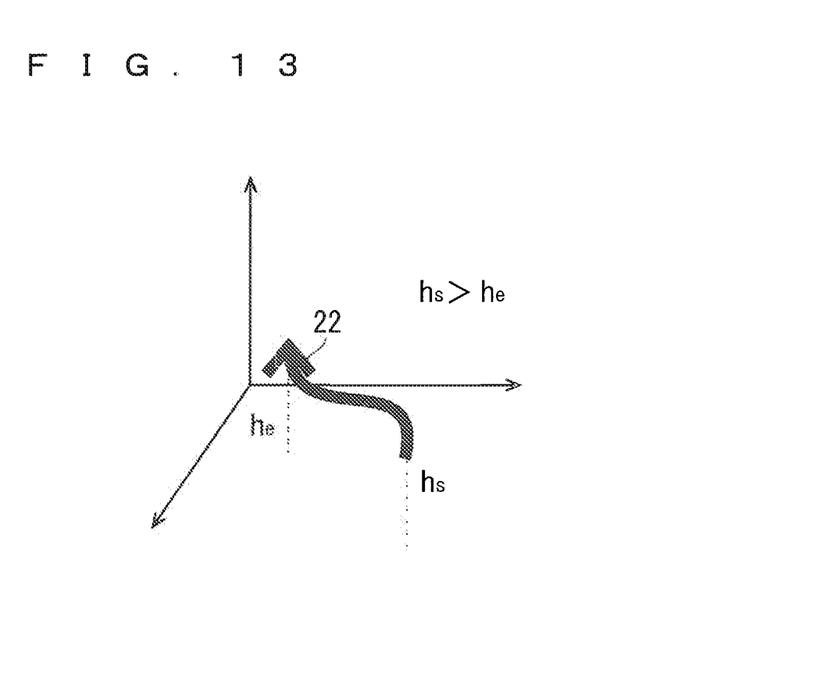
FIG. 13 A diagram illustrating an example of a sound image pattern according to the embodiment 2 of the present invention.

In Step S304, the sound image pattern generating unit 15 generates the sound image pattern in accordance with the upward slope or the downward slope based on the travel condition information (the information of the upward slope or the downward slope) acquired by the travel condition information acquiring unit 14. For example, when the vehicle traveling along the expressway exits an exit ramp located on the downward slope, the sound image pattern generating unit 15 generates the sound image pattern of the notification sound 22 as illustrated in FIG. 12. Specifically, the sound image pattern generating unit 15 generates the sound image pattern of the notification sound 22 such that the sound image pattern of the notification sound 22 moves in a downward direction toward a front side (in FIG. 12, the sound image pattern of the notification sound 22 moves in a vertical direction with respect to a traveling direction of the vehicle) in accordance with a state where the exit ramp is located on the downward slope. A height of the sound image pattern of the notification sound 22 at this time is higher in the start position (hs) than the end position (he) of the sound image pattern of the notification sound 22 as illustrated in FIG. 13.

In Step S307, the sound output controller 17 controls the acoustic device 11 so that the acoustic device 11 outputs the notification sound which is a combination of the sound image pattern generated in the sound image pattern generating unit 15 and the original sound generated in the original sound generating unit 16. Accordingly, the notification sound which is a combination of the sound image pattern generated in Step S304 and the original sound generated in Step S305 is output from the speakers 18 and 19 of the acoustic device 11. It is also applicable to further emphasize the vehicle traveling on the upward slope or the downward slope by fluctuating the original sound, that is to say, by changing the frequency of the original sound generated in the original sound generating unit 16.

In the above description, a second notification sound 23 which does not have the sound image pattern may be generated in addition to the notification sound 22 which is a first notification sound having the sound image pattern. Specifically, for example, the first notification sound 22 is the notification sound which is the combination of the sound image pattern corresponding to the change of the course and the original sound and the second notification sound 23 is the original sound corresponding to the upward slope or the downward slope. The second notification sound 23 can express the upward slope by changing the frequency of the original sound generated in the original sound generating unit 16 from the low frequency to the high frequency, and can express the downward slope by changing the frequency of the original sound from the high frequency to the low frequency, for example.

As described above, according to the present embodiment 2, the passenger can be previously notified of the change of the motion of the vehicle which automatically travels. In the example in FIG. 12, the passenger of the vehicle can be previously notified of the vehicle moving ahead to the left, the vehicle moving downward (moving down the slope), and the vehicle decreasing the speed, thus can prepare for the future motion of the vehicle. As described above, it is obvious that the motion of the vehicle includes a three-dimensional traveling route and three-dimensional acceleration and rotation.

Embodiment 3

A case where the vehicle travels based on an automatic driving level is described in the embodiment 3 of the present invention. Since the configurations of the automatic driving control device and the notification control apparatus according to the present embodiment 3 are similar to those of the automatic driving control device 1 and the notification control apparatus 2 according to the embodiment 1 (refer to FIG. 1), the detailed description is omitted here. The description hereinafter is based on an assumption that the automatic driving control device and the notification control apparatus according to the present embodiment 3 are the automatic driving control device 1 and the notification control apparatus 2 illustrated in FIG. 1.

Figure 14:
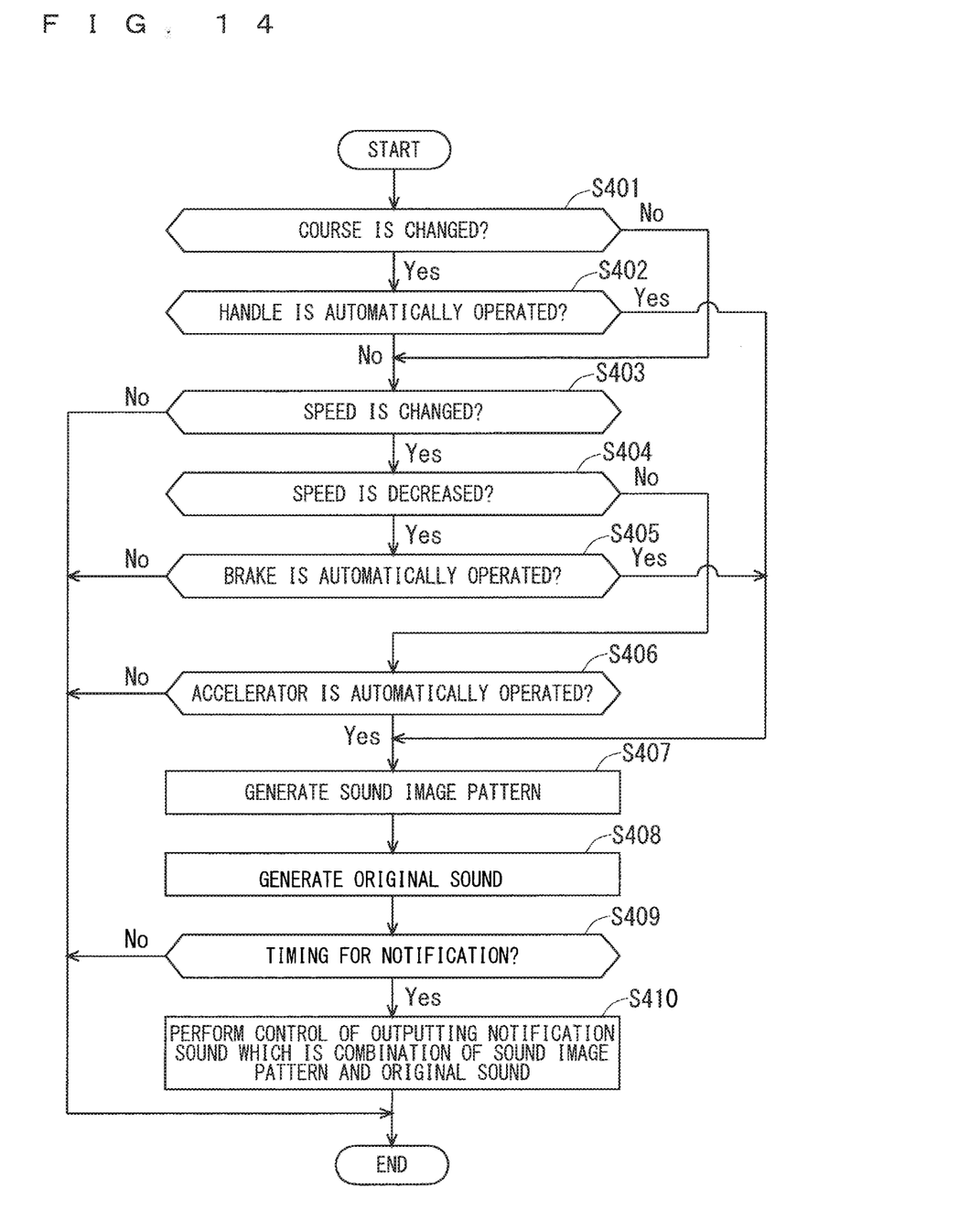
FIG. 14 A flow chart illustrating an example of an operation of the notification control apparatus according to an embodiment 3 of the present invention.

FIG. 14 is a flow chart illustrating an example of an operation of the notification control apparatus 2 according to the present embodiment 3, and illustrates an example of an operation of the vehicle automatically traveling along a predetermined route. Since Step S401, Step S407 to Step S409 in FIG. 14 correspond to Step S201, Step S203 to Step S205 in FIG. 4, the description is omitted here. Step S402 to Step S406 and Step S410 are described hereinafter.

In Step S402, the travel condition information acquiring unit 14 determines whether or not the handle is automatically operated. Specifically, the travel condition information acquiring unit 14 determines whether or not the automatic driving level is set, and determines whether or not the handle is automatically operated when the automatic driving level is set.

Herein, the automatic driving level indicates a degree of the automatic driving of the vehicle, and the automatic driving levels 0 to 4 are defined in Japan, for example. At least one of the accelerator (accelerating), the handle (steering), and the brake (braking) is automatically operated (automatically controlled) in accordance with the automatic driving levels 1 to 4. Specifically, a total number of the components which are automatically operated increases with increase in the automatic driving level. A change design of the automatic driving level for each travel road section may be preset, or the driver may change the setting at an optional timing. When the handle is automatically operated, the processing makes a transition to Step S407. In the meanwhile, when the handle is not automatically operated, the processing makes a transition to Step S403.

In Step S403, the travel condition information acquiring unit 14 determines whether or not the speed is changed. Specifically, the travel condition information acquiring unit 14 determines whether or not the automatic driving is set, and when the automatic driving is set, the travel condition information acquiring unit 14 determines whether or not the brake is automatically operated in Step S405 in the deceleration and determines whether or not the accelerator is automatically operated in Step S406 in the acceleration. When the brake in the deceleration or the accelerator in the acceleration is automatically operated, the processing makes a transition to Step S407.

Figure 15:
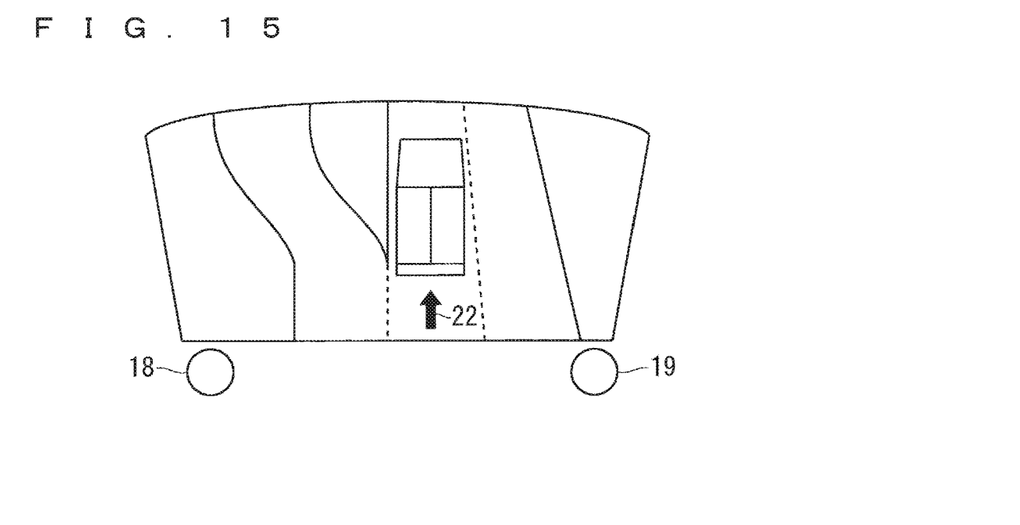
FIG. 15 A drawing illustrating an example of an operation of the notification control apparatus according to the embodiment 3 of the present invention.

In Step S410, the sound output controller 17 controls the acoustic device 11 so that the acoustic device 11 outputs the notification sound which is a combination of the sound image pattern generated in the sound image pattern generating unit 15 and the original sound generated in the original sound generating unit 16. Accordingly, the notification sound corresponding to the travel condition of the vehicle is output from the speakers 18 and 19 of the acoustic device 11. For example, as illustrated in FIG. 15, the notification sound 22 is output in the acceleration or the deceleration of the vehicle when the accelerator or the brake is automatically operated.

In the above description, the notification sound according to the change of speed may be expressed only by the second notification sound 23 made up of only the original sound without moving the sound image.

The sound image pattern generating unit 15 may increase movement amount and oscillation change amount of the sound image in the automatic driving levels 3 and 4 compared to the automatic driving levels 1 and 2. In the similar manner, the original sound generating unit 16 may increase volume and frequency change amount of the original sound in the automatic driving levels 3 and 4 compared to the automatic driving levels 1 and 2. The passenger in the vehicle traveling in the automatic driving levels 3 and 4 is often in a relaxed state, and such a passenger can be notified of the motion of the vehicle more emphatically.

As described above, according to the present embodiment 3, the passenger can be previously notified of the change of the motion of the vehicle which automatically travels by the output of the notification sound corresponding to only the component, that is the accelerator, the handle, or the brake, which is automatically operated. Accordingly, the passenger of the vehicle can obtain the appropriate amount of information that he/she needs (not only the information of the component which is manually operated but also the information of the component which is automatically operated), thus can prepare for the future motion of the vehicle.

The notification control apparatus described above can be applied not only to an in-vehicle navigation device, that is to say, a car navigation device but also to a portable navigation device (PND) which can be mounted on the vehicle and a mobile communication terminal (for example, a mobile phone, a smartphone, and a tablet terminal), and a navigation device constructed as a system in combination with a server, for example, appropriately. In the above case, each function or each constituent element of the notification control apparatus is dispersedly disposed in each function constituting the system described above.

Figure 16:
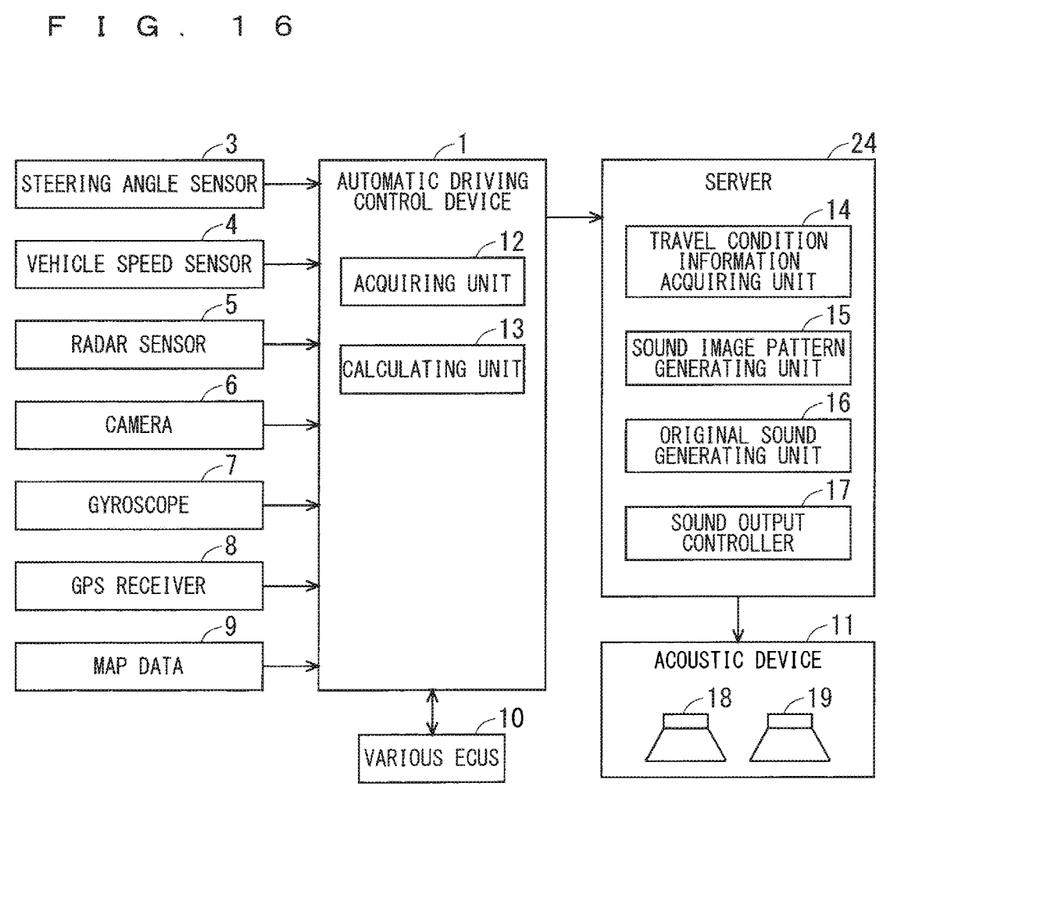
FIG. 16 A block diagram illustrating an example of a configuration of a notification control system according to the embodiment of the present invention.

Specifically, the function of the notification control apparatus can be disposed in the server as an example. For example, as illustrated in FIG. 16, the automatic driving control device 1 and the acoustic device 11 are provided on a user side, and the travel condition information acquiring unit 14, the sound image pattern generating unit 15, the original sound generating unit 16, and the sound output controller 17 are provided in a server 24, thus the notification control system can be constituted.

Figure 17:
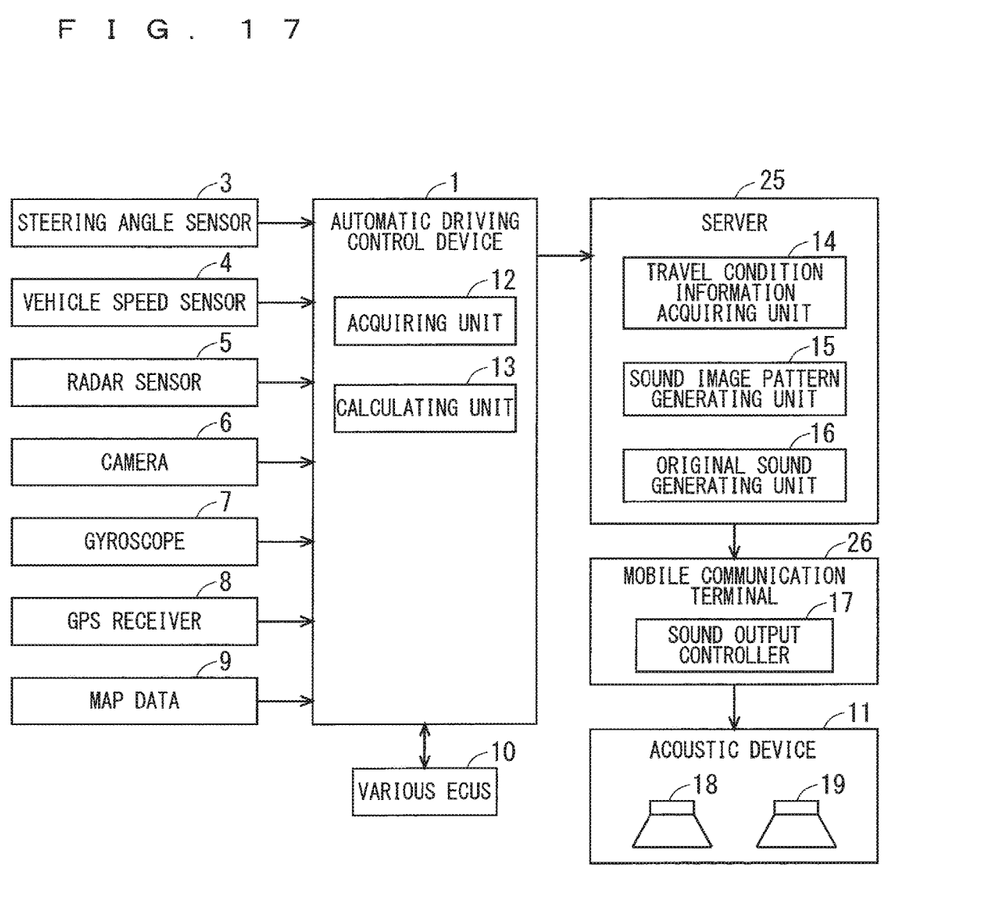
FIG. 17 A block diagram illustrating an example of a configuration of the notification control system according to the embodiment of the present invention.

The function of the notification control apparatus can be disposed in the server and the mobile communication terminal as the other example. For example, as illustrated in FIG. 17, the automatic driving control device 1 and the acoustic device 11 are provided on the user side, the travel condition information acquiring unit 14, the sound image pattern generating unit 15, and the original sound generating unit 16 are provided in a server 25, and the sound output controller 17 is provided in the mobile communication terminal 26, thus the notification control system can be constituted.

Even the above configuration can also obtain the effect similar to that of the embodiment described above.

Software for executing the operation in the embodiment described above (notification control method) may be incorporated into the server or the mobile communication terminal, for example.

Specifically, the notification control method described above as an example is a notification control method of performing a control of transmitting notification of a motion of a vehicle traveling automatically to an interior of the vehicle. Controlled in the method are acquiring the travel condition information which is the information indicating the future travel condition of the vehicle, generating the original sound from the predetermined speech waveform, generating the sound image pattern in which the sound image localization position changes along with the elapse of time based on the travel condition information, generating the notification sound in which the sound image localization position of the original sound changes along with the elapse of time in accordance with the sound image pattern, and controlling the output of the notification sound.

As described above, the software for executing the operation in the above embodiment is incorporated into the server or the mobile communication terminal and operated, thus the effect similar to that of the embodiment described above can be obtained.

According to the present invention, the above embodiments can be arbitrarily combined, or each embodiment can be appropriately varied or omitted within the scope of the invention.

The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

1 automatic driving control device, 2 notification control apparatus, 3 steering angle sensor, 4 vehicle speed sensor, 5 radar sensor, 6 camera, 7 gyroscope, 8 GPS receiver, 9 map data, 10 various ECUs, 11 acoustic device, 12 acquiring unit, 13 calculating unit, 14 travel condition information acquiring unit, 15 sound image pattern generating unit, 16 original sound generating unit, 17 sound output controller, 18, 19 speaker, 20 processor, 21 memory, 22 notification sound, 23 second notification sound, 24, 25 server, 26 mobile communication terminal.

The invention claimed is:

1. A notification control apparatus performing a control of transmitting notification of a motion of a vehicle traveling automatically to an interior of the vehicle, comprising:
a processor to execute a program; and
a memory to store the program which, when executed by the processor performs processes of,
acquiring travel condition information which is information indicating an intended future travel condition of the vehicle,
generating an original sound from a predetermined speech waveform,
generating a sound image pattern in which a sound image localization position changes along with an elapse of time based on the travel condition information which has been acquired, and
generating a notification sound in which the sound image localization position of the original sound changes along with an elapse of time in accordance with the sound image pattern which has been generated and, controlling the output of the notification sound, wherein
the travel condition information includes information of an intended future course of the vehicle, and
when the course is changed, the sound image pattern in accordance with the course being changed is generated.

2. The notification control apparatus according to claim 1, wherein
the travel condition information includes information of an intended future speed of the vehicle, and
when the course or the speed is changed, the original sound in accordance with the change of the course or the speed of the vehicle is generated.

3. The notification control apparatus according to claim 1, wherein
when the vehicle travels on an upward slope or a downward slope in the course, the sound image pattern in accordance with the upward slope or the downward slope is generated.

4. The notification control apparatus according to claim 1, wherein
when the vehicle travels on an upward slope or a downward slope in the course, the original sound in accordance with the upward slope or the downward slope is generated.

5. The notification control apparatus according to claim 1, wherein
when a degree of change of the course or a slope change of the course is equal to or smaller than a threshold value, the sound image pattern and the original sound are not generated.

6. The notification control apparatus according to claim 1, wherein
the travel condition information further includes information of an intended future speed of the vehicle, and
when a degree of change of the speed is equal to or smaller than a threshold value, the sound image pattern and the original sound are not generated.

7. A notification control apparatus performing a control of transmitting notification of a motion of a vehicle traveling automatically to an interior of the vehicle, comprising:
a processor to execute a program; and
a memory to store the program which, when executed by the processor, performs processes of,
acquiring travel condition information which is information indicating an intended future travel condition of the vehicle,
generating an original sound from a predetermined speech waveform,
generating a sound image pattern in which a sound image localization position changes along with an elapse of time based on the travel condition information which has been acquired,
generating a notification sound in which the sound image localization position of the original sound changes along with an elapse of time in accordance with the sound image pattern which has been generated and, controlling the output of the notification sound, generating the sound image pattern based on an automatic driving level indicating a degree of the automatic driving, and generating the original sound based on the automatic driving level.

8. The notification control apparatus according to claim wherein the travel condition information includes information of an intended future course or speed of the vehicle, and when the course or the speed is changed, the sound image pattern in accordance with the course or the speed being changed is generated.

9. The notification control apparatus according to claim wherein the travel condition information includes information of an intended future course or speed of the vehicle, and when the course or the speed is changed, the original sound in accordance with the change of the course or the speed of the vehicle is generated.

10. A notification control method performing a control of transmitting notification of a motion of a vehicle traveling automatically to an interior of the vehicle, comprising:

acquiring travel condition information which is information indicating an intended future travel condition of the vehicle;

generating an original sound from a predetermined speech waveform;

generating a sound image pattern in which a sound image localization position changes along with an elapse of time based on the travel condition information; and generating a notification sound in which the sound image localization position of the original sound changes along with an elapse of time in accordance with the sound image pattern, and controlling the output of the notification sound, wherein the travel condition information includes information of an intended future course of the vehicle, and when the course is changed, the sound image pattern in accordance with the course being changed is generated.

* * * * *